and Systems, 1994., Proceedings of the 37th Midwest Symposium on

United States Patent
Xu et al.

(10) Patent No.: US 8,027,938 B1
(45) Date of Patent: Sep. 27, 2011

(54) DISCRIMINATIVE TRAINING IN MACHINE LEARNING

(75) Inventors: Peng Xu, San Jose, CA (US); Ioannis Tsochandaridis, San Francisco, CA (US)

(73) Assignee: Google Inc., Mountain View, CA (US)

( * ) Notice: Subject to any disclaimer, the term of this patent is extended or adjusted under 35 U.S.C. 154(b) by 677 days.

(21) Appl. No.: 12/055,967

(22) Filed: Mar. 26, 2008

Related U.S. Application Data

(60) Provisional application No. 60/920,243, filed on Mar. 26, 2007.

(51) Int. Cl.
*G06F 15/18* (2006.01)
(52) U.S. Cl. .................................................. 706/12
(58) Field of Classification Search ................ 706/12
See application file for complete search history.

(56) References Cited

U.S. PATENT DOCUMENTS

| | | | | |
|---|---|---|---|---|
| 6,381,563 | B1 * | 4/2002 | O'Riordan et al. | 703/14 |
| 6,848,084 | B1 * | 1/2005 | Pandey et al. | 716/107 |
| 7,124,377 | B2 * | 10/2006 | Catthoor et al. | 716/102 |
| 7,263,674 | B2 * | 8/2007 | Lorenz | 716/102 |
| 7,272,575 | B2 * | 9/2007 | Vega | 705/80 |
| 7,599,799 | B2 * | 10/2009 | Friend et al. | 702/19 |
| 7,606,403 | B2 * | 10/2009 | Haussecker et al. | 382/128 |
| 7,620,743 | B2 * | 11/2009 | Gehman et al. | 710/8 |
| 7,634,393 | B1 * | 12/2009 | Tunick et al. | 703/5 |
| 7,694,249 | B2 * | 4/2010 | Hamilton et al. | 716/136 |

OTHER PUBLICATIONS

Large hierarchical object recognition using libraries of parameterized model sub-parts, Ettinger, G.J.; Computer Vision and Pattern Recognition, 1988. Proceedings CVPR '88., Computer Society Conference on Digital Object Identifier: 10.1109/CVPR.1988.196212 Publication Year: 1988 , pp. 32-41.*
Modeling complex information systems using parameterized Petri nets (PPNs), Srinivasan, P.; Gracanin, D.; Brockhaus, D.; Circuits and Systems, 1994., Proceedings of the 37th Midwest Symposium on vol. 1 Digital Object Identifier: 10.1109/MWSCAS.1994.519395 Publication Year: 1994 , pp. 735-738.*
Model-checking problems as a basis for parameterized intractability, Flum, J.; Grohe, M.; Logic in Computer Science, 2004. Proceedings of the 19th Annual IEEE Symposium on Digital Object Identifier: 10.1109/LICS.2004.1319633 Publication Year: 2004 , pp. 388-397.*
An analytical model for designing memory hierarchies, Jacob, B.L.; Chen, P.M.; Silverman, S.R.; Mudge, T.N.; Computers, IEEE Transactions on vol. 45 , Issue: 10 Digital Object Identifier: 10.1109/12.543711 Publication Year: 1996 , pp. 1180-1194.*

(Continued)

*Primary Examiner* — Michael B Holmes
(74) *Attorney, Agent, or Firm* — Fish & Richardson P.C.

(57) ABSTRACT

Systems, methods, and apparatuses including computer program products for machine learning are provided. A method is provided that includes distributing a parameterized model to each worker of a hierarchy of workers, the parameterized model including a plurality of feature functions and corresponding model parameters, processing a portion of training data at each worker of the plurality of workers according to the parameterized model to calculate updates to model parameters, for each worker at a lowest level of the hierarchy of workers, sending the calculated updates to a next higher level worker, for each other worker in the hierarchy of workers, combining updates of the respective worker with updates received from one or more lower level workers, collecting all updates from the workers at a master to generate real updates to the model parameters, and generating an updated model using the real updates to the model parameters.

39 Claims, 4 Drawing Sheets

OTHER PUBLICATIONS

Breiman, Leo, "Bagging Predictors," Machine Learning, 24, 1996, pp. 123-140.

Collins, Michael, "Parameter Estimation For Statistical Parsing Models: Theory and Practice Of Distribution-Free Methods," Chapter 2, H. Bunt et al. (eds.), New Technologies in Parsing Technology, 2004, pp. 19-55.

Collins et al., "Incremental Parsing with the Perceptron Algorithm," 42nd Annual Meeting of the Association for Computational Linguistics, Jul. 21-26, 2004, Barcelona, Spain, 9 pages.

Daume et al., "Learning as Search Optimization: Approximate Large Margin Methods for Structured Prediction," Proceedings, Twenty-Second International Conference on Machine Learning, 2005, 11 pages.

Koehn, Philipp, "Pharaoh: A Beam Search Decoder for Phrase-Based Statistical Machine Translation Models," Frederking et al. (Eds.): AMTA 2004, LNAI 3265, pp. 115-124.

Liang et al., "An End-to-End Discriminative Approach to Machine Translation," Proceedings of the 21st International Conference on Computational Linguistics and 44th Annual Meeting of the ACL, Sydney, Jul. 2006, pp. 761-768.

Liu et al., "On The Limited Memory BFGS Method For Large Scale Optimization," Mathematical Programming 45, 1989, pp. 503-528.

Och, Franz Josef, "Minimum Error Rate Training in Statistical Machine Translation," Proceedings of the 415' Annual Meeting of the Association for Computational Linguistics, Sapporo, Japan, pp. 160-167.

Papineni et al., "BLEU: a Method for Automatic Evaluation of Machine Translation," Proceedings of the 40th Annual Meeting of the Association for Computational Linguistics (ACL), Philadelphia, Jul. 2002, pp. 311-318.

Ratliff et al., "(Online) Subgradient Methods for Structured Prediction," Jan. 1, 2007, Eleventh International Conference on Artificial Intelligence and Statistics, San Juan, Puerto Rico, 9 pages.

Roark et al., "Discriminative Language Modeling with Conditional Random Fields and the Perceptron Algorithm," 42nd Annual Meeting of the Association for Computational Linguistics, Jul. 21-26, 2004, Barcelona, Spain, 9 pages.

Tsochantaridis et al., "Large Margin Methods for Structured and Interdependent Output Variables," Journal of Machine Learning Research 6, 2005, pp. 1453-1484.

Vishwanathan et al., "Step Size Adaptation in Reproducing Kernel Hilbert Space," Journal of Machine Learning Research 7, 2006, pp. 1107-1133.

Vishwanathan et al., "Accelerated Training of Conditional Random Fields with Stochastic Gradient Methods," In Proceedings of the International Conference on Machine Learning, 2006, 8 pages.

Yamada et al., "Reranking for Large-Scale Statistical Machine Translation," Neural Information Processing Systems, 2006, Machine Translation Workshop, Vancouver, Canada, 20 pages.

Zanni et al., "Parallel Software for Training Large Scale Support Vector Machines on Multiprocessor Systems*," Journal of Machine Learning Research 7, 2006, pp. 1467-1492.

Collins, Michael, "Discriminative Training Methods for Hidden Markov Models: Theory and Experiments with Perceptron Algorithms," Proceedings of the 2002 Conference on Empirical Methods in Natural Language Processing, Jul. 6-7, 2002, 10 pages.

Taskar et al., "Max-Margin Markov Networks," Advances in Neural Information Processing Systems 16, Copyright 2004 Massachusetts Institute of Technology, 11 pages.

"MPI: A Message-Passing Interface Standard," Message Passing Interface Forum, University of Tennessee, Knoxville, TN, Nov. 15, 2003, 238 pages.

* cited by examiner

DISCRIMINATIVE TRAINING IN MACHINE LEARNING

CROSS-REFERENCE TO RELATED APPLICATIONS

This application claims the benefit under 35 U.S.C. §119(e) of U.S. Provisional Patent Application No. 60/920,243, titled "Parallel Online Learning for Discriminative Training in Machine Translation," filed Mar. 26, 2007, which is incorporated here by reference.

BACKGROUND

This specification relates to training machine learning systems.

Machine learning typically uses statistical techniques to iteratively process training data in order to improve the accuracy of one or more predictive functions. One type of machine learning is a classification system that generates a function mapping inputs to desired outputs. The system learns parameters of a function that maps a vector into one of several classes by looking at several input-output examples.

Machine learning can be used in a number of applications including natural language processing, syntactic pattern recognition, and speech recognition.

Structured prediction refers to a generalization of multiclass classification to problems where the predicted outputs describe a configuration over components with possible dependencies between components. Typically, these types of problems involve exponentially large output sets, require computationally intensive decoding algorithms, and call for the optimization of complicated loss functions. Some approaches to these types of problems, e.g., maximum margin approaches or voted perceptron in natural language processing, do not scale well to very large numbers of training examples or to models having a very large number of features.

SUMMARY

Systems, methods, and apparatuses including computer program products for machine learning are provided. In general, in one aspect, a method is provided. The method includes distributing a parameterized model to each worker of a plurality of workers, the plurality of workers being arranged in a hierarchy of workers, the parameterized model including a plurality of feature functions representing a plurality of features and corresponding model parameters, processing a portion of training data at each worker of the plurality of workers according to the parameterized model, the training data including a number of training examples, to calculate updates to model parameters, for each worker at a lowest level of the hierarchy of workers, sending the calculated updates to a next higher level worker, for each other worker in the hierarchy of workers, combining updates of the respective worker with updates received from one or more lower level workers, collecting all updates from the workers at a master to generate real updates to the model parameters, generating an updated model using the real updates to the model parameters, and distributing the updated model to each worker when performing a next iteration.

Other embodiments of the aspect include systems and computer program products.

Implementations can include one or more of the following features. The training data can include a plurality of example input output pairs, each example input-output pair including an input and a correct output. Identifying updates can include providing a first input to the model from a first example input-output pair, calculating a difference between an output generated by the model according to the input and the correct output of the first example input-output pair, determining which model features fire in response to the example input, and calculating an update to one or more model parameters associated with the firing model features.

The aspect can further include receiving training data and assigning a distinct portion of the training data to each worker. The aspect can further include dynamically defining the hierarchy of workers according to a size of the received training data. Generating real updates can include calculating a quotient of combined updates for a parameter and the number of workers contributing to the combined updates. Each worker can independently process the respective portion of the training data in an online manner to generate worker level updates to model parameters. Generating the updated model can further include comparing parameter updates for each feature to a threshold contribution score and when the parameter updates for a particular feature are below a threshold contribution score, updating the model without updating the parameter value for the particular feature.

In general, in one aspect, a method is provided. The method includes receiving training data, the training data including source and target language pairs, distributing portions of the training data to each worker of a plurality of workers where the plurality of workers are arranged in a hierarchy of workers, identifying a parameterized model that includes a plurality of features and corresponding parameters, the features including lexical n-gram features, training the model, and distributing an updated model to each worker when performing a next iteration. Training the model includes distributing the model to each worker of the hierarchy of workers, processing a portion of training data at each worker of the plurality of workers according to the parameterized model to identify updates to the model parameters, for each worker at a lowest level of the hierarchy of workers, sending the calculated parameter updates to a next higher level worker, for each other worker in the hierarchy of workers, combining parameter updates of the respective worker with parameter updates received from one or more lower level workers, collecting all updates from the workers at a master to generate real updates to the model parameters, and generating an updated model using the real updates to the parameters.

Other embodiments of the aspect include systems and computer program products.

Implementations can include one or more of the following features. Generating real updates can include calculating a quotient of combined updates for a parameter and the number of workers contributing to the combined updates. Generating the updated model can further include comparing parameter updates for each feature to a threshold contribution score and when the parameter updates for a particular feature are below a threshold contribution score, updating the model without updating the parameter value for the particular feature.

The aspect can further include performing a plurality of iterations, each iteration including distributing an updated model, the updated model generated during a previous iteration, to each worker and generating parameter updates by applying the portion of the training data assigned to each worker to the updated model of the iteration. The aspect can further include, when no more iterations are to be performed, using the last updated model to process input text to provide translated output text.

Particular embodiments of the subject matter described in this specification can be implemented to realize one or more of the following advantages. The system can learn parameters (e.g., feature weights) for millions of model features over hundreds of thousands to virtually unlimited numbers of training data examples. The system improves robustness of a large margin online learning algorithm without sacrificing convergence rates. The distributed architecture is designed to take advantage of inexpensive hardware components (e.g., computer clusters) by allowing efficient failure recovery.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
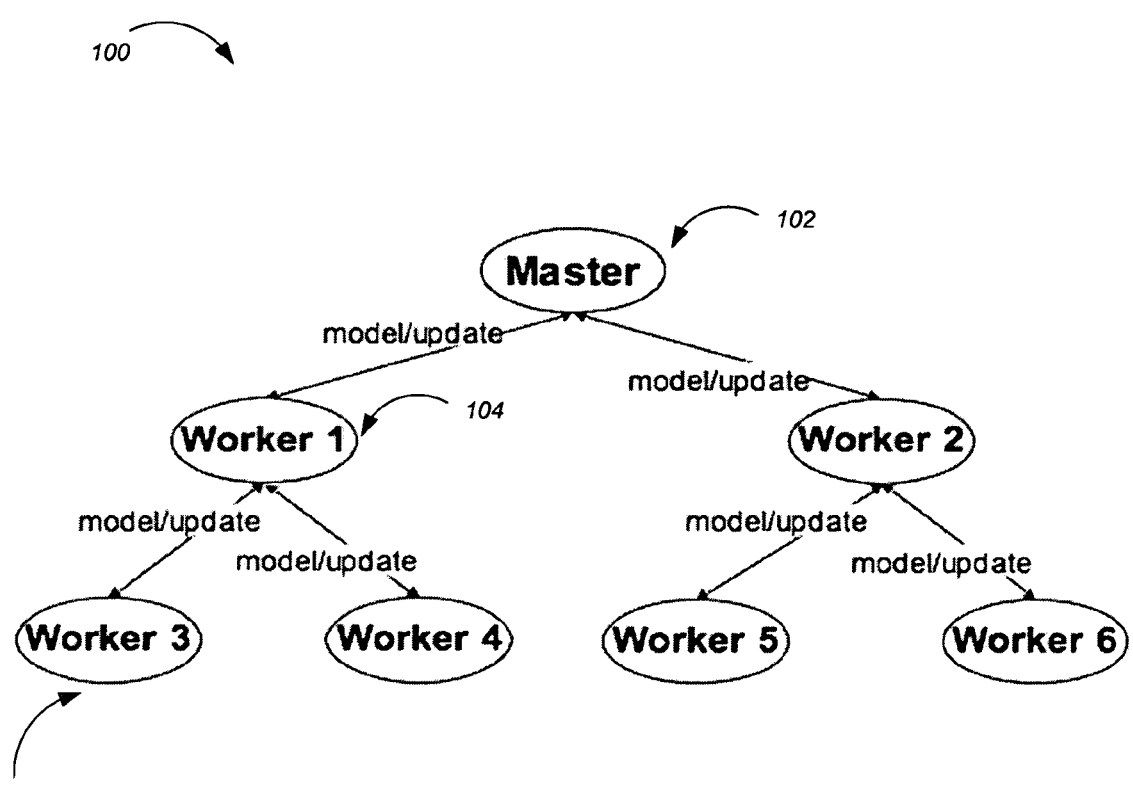
FIG. 1 shows an example distributed architecture for discriminative training

FIG. 1 shows an example distributed architecture 100 for discriminative training. The architecture 100 includes a master process (master 102) and multiple worker processes (workers 104 and 106). The workers can be hierarchically organized. In particular distributed architecture 100 includes first level workers 104 and second level workers 106. Each second level worker 106 is in communication with a first level worker 106. For example, one second level worker 106 "worker 6" is shown as in communication with first level worker 104 "worker 2". Similarly, each first level worker 104 is in communication with the master 102.

In the distributed architecture 100, a specified computation operation (e.g., a particular model) upon which data is to be processed is disturbed down from the master to the workers level-by-level. After processing data at each worker, updates can be sent up in the reverse direction level-by-level to the master 102. Updates from lower level workers can be combined at each level according to one or more specified combination operations and then passed up to the next level.

While the distributed architecture 100 is shown as a binary tree, other architectures can have other configurations. In some implementations, the number and arrangement of workers is dynamically generated before processing particular training data, for example, to minimize communication costs. Additionally, the distributed architecture 100 can be scaled as necessary to include many worker at each level and many levels of workers all having the master operating as a root node for the tree structure.

The master 102 maintains the tree structure of the workers 104 and 106. Additionally, the master 102 initializes the computation operation (e.g., the model) at a beginning of a discriminative learning operation. The master 102 broadcasts the model to the participating workers along with the tree structure. Knowledge of the tree structure allows the workers to determine whether updates have been received from all lower level workers and which upper level process (e.g., next level worker or the master) to send updates to.

Additionally, the master 102 generates a new model using the updates received from the workers 104 and 106. Once launched, the master 102 drives the computations until one or more specified stopping criteria are satisfied (e.g., a specified number of iterations, a specified result).

Data for performing the discriminative learning process (e.g., training data), can be separated into disjoint parts and processed independently, and in parallel, by the workers. Each worker carries out the computation (e.g., according to the received model) for a portion of the training data assigned to the respective worker. The workers then send results (e.g., model parameter updates) to the master either directly or indirectly depending on the level of the particular worker. For example, a particular worker can perform a local combination of results from lower level workers in communication with the worker.

The distributed architecture 100 allows for independent processing of parts of the training data by the workers 104 and 106 while also allowing independent combination of results from all data parts to produce a global view of the results. The master 102 uses the global view of results to generate a new, updated model, which can then be distributed to, and used for another processing iteration by, the workers 104 and 106.

The distributed architecture 100 can be used for batch learning techniques as well as online learning techniques. In some implementations, batch learning techniques can be directly used with the distributed architecture 100 while online learning techniques can require approximation in order to be performed according to the distributed architecture 100.

A batch technique keeps model parameters constant while calculating an error associated with each input training example. In contrast an online technique constantly updates its parameters following each training example such that its error calculation uses different weights for each input.

The distributed architecture 100 also allows for recovery from failure of any particular workers. For example, if a particular worker fails, a different worker can be assigned by the master. The master can instruct the worker as to its position within the tree structure such that the worker knows which data part to process as well as which workers to send updates to or receive updates from during a processing iteration.

Figure 2:
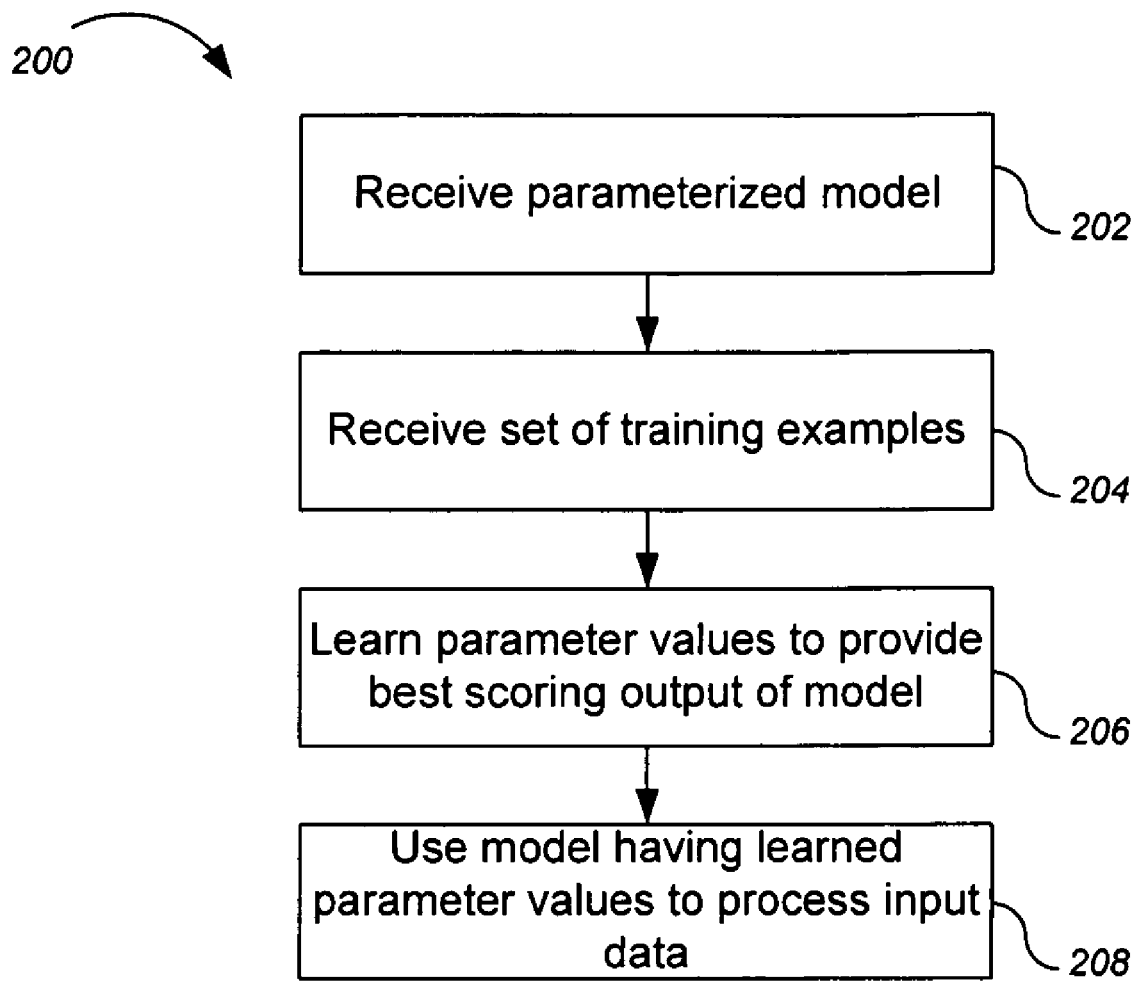
FIG. 2 is a flowchart of an example process for discriminative training

FIG. 2 is a flowchart of an example process 200 for discriminative training. For convenience, the process 200 will be described with respect to a system (e.g., a discriminative training system) that performs the process 200.

The system receives 202 a parameterized model. The parameterized model is used to compute a best scoring output. In particular, a given linear model is used to compute the one or more parameters such that the likelihood of a given input resulting in a correct output is maximized according to particular scoring criteria.

For example, for a machine translation system, the model can be trained to compute parameters to maximize the likelihood that a given input sentence in a first language is correctly translated into a target language sentence. The scoring criteria used to estimate the maximum likelihood can be, for example, a Bilingual Evaluation Understudy ("BLEU") score BLEU is a method for evaluating the quality of text which has been translated from one natural language to another using machine translation. The BLEU score provides a measure of the statistical closeness of machine translations to reference translations.

The BLEU score is described, for example, in Kishore Papineni, Salim Roukos, Todd Ward, and Wei-Jing Zhu, "BLEU: a Method for Automatic Evaluation of Machine Translation," Proceedings of the 40th Annual Meeting on the Association for Computational Linguistics, pages 311-318, July 2002. The BLEU score is a geometric mean of a ratio of matching n-grams of length one to four between a candidate translation and a group of reference translations, along with a length term penalizing short sentences. The sufficient statistics of the BLEU score are the number of matching n-grams (i.e., n-gram precisions for the group of reference translations), the candidate translation length, and the effective length of the reference translations of the group.

A particular linear model parameterized by w can compute a best scoring output according to:

$$\hat{y}(x, w) = \arg\max_{y \in GEN(x)} w \cdot \Phi(x, y)$$

where GEN(x) is a set of possible outputs given an input x and $\Phi(x, y)$ is a set of feature functions defined on (x, y) where each (x, y) is an input (x) output (y) pair. The number of features defined by the set of feature functions can be very large (e.g., millions). Additionally, w represents a vector of model parameters (also referred to as feature weights). Each entry in the vector corresponds to a particular feature such that the length of the vector is equal to the total number of features.

For example, in machine translation systems, the features can include individual n-grams and their associated probabilities. An n-gram is a sequence of n consecutive words. An n-gram has an order, which is the number of words in the n-gram. For example, a 1-gram (or unigram) includes one word; a 2-gram (or bigram) includes two words. In some implementations, a translation system uses the technique to train other forms of language model features, e.g., long-distance language model features, phrase table features, or syntactic features.

Thus, $\hat{y}(x, w)$ represents estimated, or most likely, y outputs as a function of an input x, feature functions associated with the input x, and corresponding model parameters (e.g., feature weights) w. The parameters w are calculated to provide maximum likelihood output y over all possible inputs x as a function one or more feature functions defined on (x, y). Additionally, a loss function $L(y^*, y)$ is often defined for an output y with respect to the correct output $y^*$. In general, the loss function represents a user-defined quality measure of the output.

The system receives 204 a set of training data including a number of training examples. The training examples are particular known correct input-output pairs. Thus, for a set of M training examples, M={(x, y*)} each input x has a corresponding correct output y*. For example, for machine translation systems, each input x in the training examples can be a source language sentence having a corresponding output y* representing a known target language sentence translation of input x.

The system learns 206 parameter values of w to provide best scoring output from model. The system learns the parameter values, for example, by training, in parallel, the model in an iterative process using an approximation of online discriminative training Once the model is trained to provide a best scoring output, given particular training data, the system uses 208 the model including the learned parameter values to process input data. For example, in a machine translations system, the trained model can be used to translate a given input sentence in a first natural language into a translated output sentence in another natural language. In other implementations, for example, query expansion the model input can be one or more terms in a first natural language and the model output can be one or more terms in the same natural language. Other model can be applied to other statistical machine learning applications including classification and regression.

Figure 3:
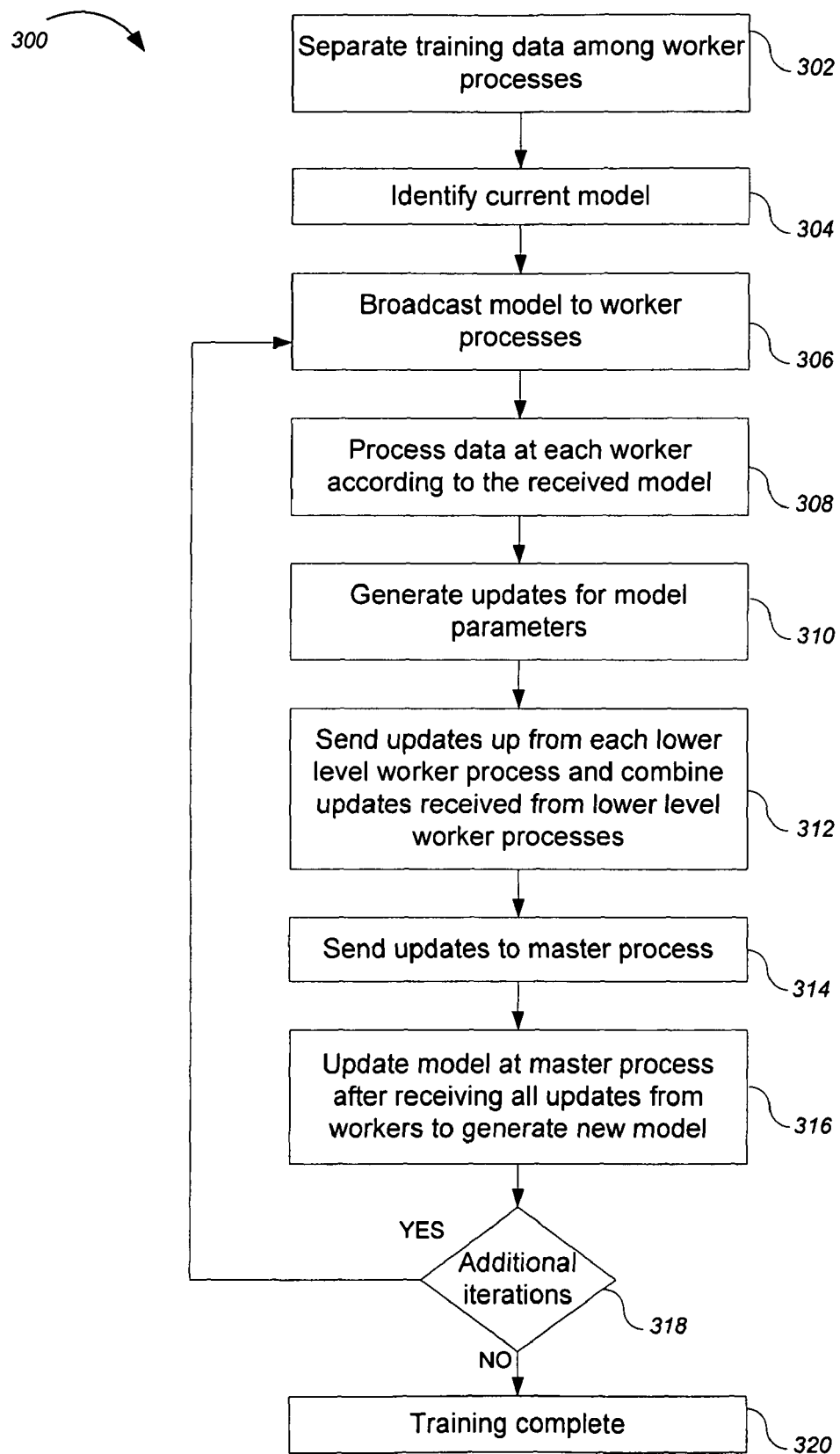
FIG. 3 is a flowchart of an example process for parallel online training of model parameters.

FIG. 3 is a flowchart of an example process 300 for parallel online training of model parameters. For convenience, the process 200 will be described with respect to a system (e.g., a discriminative training system) that performs the process 200.

The system separates 302 training data among workers. The training data can include a set of correct input-output pairs (e.g., (x, y*) pairs). The system assigns the training data into parts based on, for example, the number of available workers. In some implementations, the master identifies available workers and dynamically defines a tree structure relating the workers to the master. In some implementations, the training data is evenly divided among the workers, e.g., data parts of equal size or equal numbers of training examples per worker. In some other implementations, the training data can be separated into data parts of various sizes. Each worker becomes responsible for processing the assigned data part from the training data.

The system identifies 304 a current model. The current model can be generated by the system according to specified parameters or user input. Alternatively, the current model can be received (e.g., from a storage location or from a remote location). In some implementations, the model provides a voted perceptron technique in which parameter values converge in a finite number of iterations. An online perceptron technique begins with some initial parameter values (e.g., w=0). For each input x, if the estimated output y differs from the correct output y*, then an update operation updates the associated model parameters. If the predicted output y matches the correct output y*, then the model parameters are unchanged for that training example (no update triggered). The process is repeated for each training example assigned to the respective worker (e.g., the portion of the training data assigned to a particular worker).

For example, a particular update rule can be used to update the parameter vector w provided by:

$$w \leftarrow w + \alpha[\Phi(x, y^*) - \Phi(x, \hat{y})].$$

Where $\alpha$ is a learning rate and $\Phi(x, y^*) - \Phi(x, \hat{y})$ represents the difference between the feature functions for the predicted value $\hat{y}$ and the correct value $y^*$. The update is performed each time a misclassification occurs, which is whenever $$\hat{y}(x, w) = \arg\max_{y \in GEN(x)} w \cdot \Phi(x, y)$$

is different from y*. In other words, a particular parameter is updated when the feature functions do not provide the correct output for a given input.

In some implementations, the loss function is factored into the update rule, for example in slack-rescaled support vector machines, resulting in an update defined by:

$$w \leftarrow w + \alpha[\Phi(x, y^*) - \Phi(x, \hat{y})]L(y^*, y).$$

When the loss function is applied, the update is performed based on the predicted output of:

$$\hat{y}(x, w) = \arg\max_{y \in GEN(x)} \{1 + w \cdot [\Phi(x, y^*) - \Phi(x, y)]\} L(y^*, y).$$

Essentially, instead of using a top scoring output y, the score is rescaled by the loss with respect to the correct output.

The system broadcasts 306 the identified model to the workers. In some implementations, the master broadcasts the model to the workers. In some implementations, the model is directly broadcast to each worker. In some other alternative implementations, the model is broadcast to the first level of workers, which in turn broadcasts the model to the next level of workers. The model is broadcast level-by-level until all workers include the model.

The system independently processes 308 assigned data parts of the training data at each worker according to the received model. For example, the part of the training data assigned to each particular worker is processed according to an online technique (e.g., the perceptron or online slack-scaled SVM techniques described above). Thus, for training input-output pairs, the inputs are applied to the model to generate particular outputs. The outputs generated from the model for the training data of the particular workers are used to generate updates to the model parameters.

The workers generate 310 updates for one or more model parameters. The updates are generated according to the model and type of update rules used. For example, for a perceptron or online slack-scaled SVM techniques there are particular update rules as described above. The update rule identifies parameter values for particular features using the difference between the predicted output value and the correct output value for a given input.

The system combines 312 updates from lower level workers and sends the updates up to a next higher level that the particular worker is in communication with. For example, if a particular worker is at a lowest level (e.g., worker 3 of FIG. 2), there are no lower level workers to combine updates with. Consequently, worker 3 sends its updates up to the next level worker according to the tree structure (e.g., to worker 1).

In another example, however, if a particular worker is not at the lowest level of workers (e.g., worker 2 of FIG. 2), then worker 2 receives updates from one or more lower level workers according to the tree structure. The tree structure identifies both which worker processes are to send updates up to worker 2 as well as the worker to which worker 2 sends its combined updates. For example, worker 2 receives updates from worker 3 and worker 4 and combines them with any of its own updates.

In some implementations, each worker waits until update are received from all lower level workers that are sending updates before combining the updates. Combining the updates includes aggregating the updates from all data parts being combined at the worker. The updates are aggregated for each feature. Aggregation can include summing, identifying a maximum, or other combination of the updates.

Once the highest level workers receive aggregated updates from all lower workers operating on a data part, the highest level workers send 314 the updates to the master.

When the updates from the workers are combined at any given worker, a counter is maintained. The counter counts the number of times a given feature fires in the respective data part. A feature is firing in a data part if it is present in an output involved in the updates for that data part. In other words, the number of times particular features associated with an output result that triggers an update process is counted. The combined updates (along with the counter values) are then sent up to the next level worker (or to the master) according to the tree structure.

The master then generates 316 a new model using the updates received from one or more workers. When the master receives the updates for all of the data parts of the training data, the master calculates real updates. The real updates are calculated by dividing the update for each feature by the counter value associated with that feature (e.g., the number of data parts in which the feature was updated). For example, in a system having 10 workers, if the feature was updated in two data parts, the real update is calculated by summing the updates and then dividing by the number of data parts updated (i.e., 2). Other techniques can be used for calculating the real updates. For example, the updates can be averaged over all workers instead of just firing workers. However, this tends to penalize the updates, slowing the calculation of optimal parameter values. The real updates to the model parameters are then added to the current model to generate the new updated model.

In some implementation, the master optionally selects particular features to update in the model at each iteration. For example, when the real updates are generated for each feature, the updates can be compared to some threshold contribution value. If the contribution is small, it can be considered noise and the parameter value can be left the same. If the contribution is above the threshold, the parameter value for the feature is updated. Selecting features as opposed to updating all features can result in more iterations being required before obtaining the optimal parameter values. However, overfitting of the data can be reduced.

The system determines 318 whether additional iterations are to be performed. The number of iterations performed can be a specified number or in response to one or more conditions being satisfied. For example, a specified number (e.g., 20) of iterations can be performed regardless of the updates to the model between iterations. The specified number can be specified, for example, based on empirical data regarding the convergence of the particular model type.

In some implementations, the iterations continue until a specified condition is met. For example, the condition can be a degree of change from a prior model to the next model due to the updates. In some implementations, the condition can be a threshold number of features that are being updated. The iterations can continue until the degree or number of changes are below a threshold amount. In some other implementations, a combination of specified number of iterations and conditions are used. For example, a specified condition can be used that is capped by a specified maximum number of iterations.

When no other iterations are to be performed, the training of the model is complete 320 and can be used by a system to process input data to generate output data. However, when there are other iterations to perform, the process repeats beginning with the master broadcasting 306 the new model to the workers having a data part of the training data.

Thus, each worker process works independently on a particular part of the training data. Within each worker, online updates are generated. After each iteration, each worker receives an updated model that includes parameter updates from all other workers. Thus, an online technique can be parallelized for a distributed system.

The master synchronizes the learning process. The master initiates each subsequent iteration using an updated model only after receiving updates from all workers. This provides an approximation of online learning. The approximation allows for the combination of parallel updates that closely mimic online learning. As a result, an approximation of online learning can be performed on very large data sets distributed over multiple workers. The parallel updates generated by the online learning at each worker are combined to identify real updates for the model.

In some implementations, the online discriminative training model is used to train a statistical machine translation system. For example, a log-linear or linear model can be used for discriminative training of a machine translation system. The features of such a model are typically components of a generative model. For example, if $f_1^J$ and $e_1^I$ are two sentences in source and target languages having lengths J and I respectively, then the probability of the source sentence occurring given the target sentence, $P(f_1^J|e_1^I)$, the probability of the target sentence occurring given the source sentence, $P(e_1^I|f_1^J)$, the probability of the target sentence occurring, $P(e_1^I)$, and the target sentence length I can be used as features in the model.

The model of a machine translations system can be trained to maximize an evaluation metric for decoded sentences. For example, the system can be trained to maximize a BLEU score. When there are a small number of features, training to maximize BLEU score can be performed using an iterative online search algorithm. However, when a large number of features are used, a N-best re-ranking approach can be used. For example, when lexical n-grams are used as features, the number of features increase dramatically such that an N-best re-ranking approach can be used.

The N-best list re-ranking can be treated as a structured prediction problem where a set of candidate outputs is approximated by N-best lists decoded using a baseline linear model $w_b$. Both the voted perception and slack-scaled supported vector processes described above can be used in the machine translation framework with some modification. In particular, GEN(x) is approximated by the N-best list for x. Additionally, y* can be replaced by an oracle candidate in the N-best list. The oracle candidate is the candidate having the least lost. The loss for machine translation can be defined as $L(y^*, y)=BLEU(y^*)-BLEU(y)$, where BLEU(•) is calculated for each candidates for which there is a reference translation. This N-best version provides a particular instance of the model for use with machine translation and does not modify the process for generating and combining updates to perform iterations of updating the model parameters described above.

Training a machine translation system can include receiving training data derived from one or more parallel text collections. For example, the NIST 2006 machine translation evaluation and the LDC named entity list ("LDC2005T34") can be used to identify training data.

To prevent overfitting of the training data during discriminative training of many features, a feature selection technique can be used. In one example of overfitting, the training adapts to certain stylistic preferences in the training corpus. When the test data are very different from the training data, the overfit parameter values might not improve and might even deteriorate the quality of the translations. When the feature updates from all worker processes are received at the master, the master generates the real updates for each feature. The value of each feature update can be compared to a threshold value. If the feature has an update below the threshold it is not added to the updated model. This provides a control on the number of features selected at each iteration. The number and particular feature function updates included in the updated model can vary for each iteration.

Figure 4:
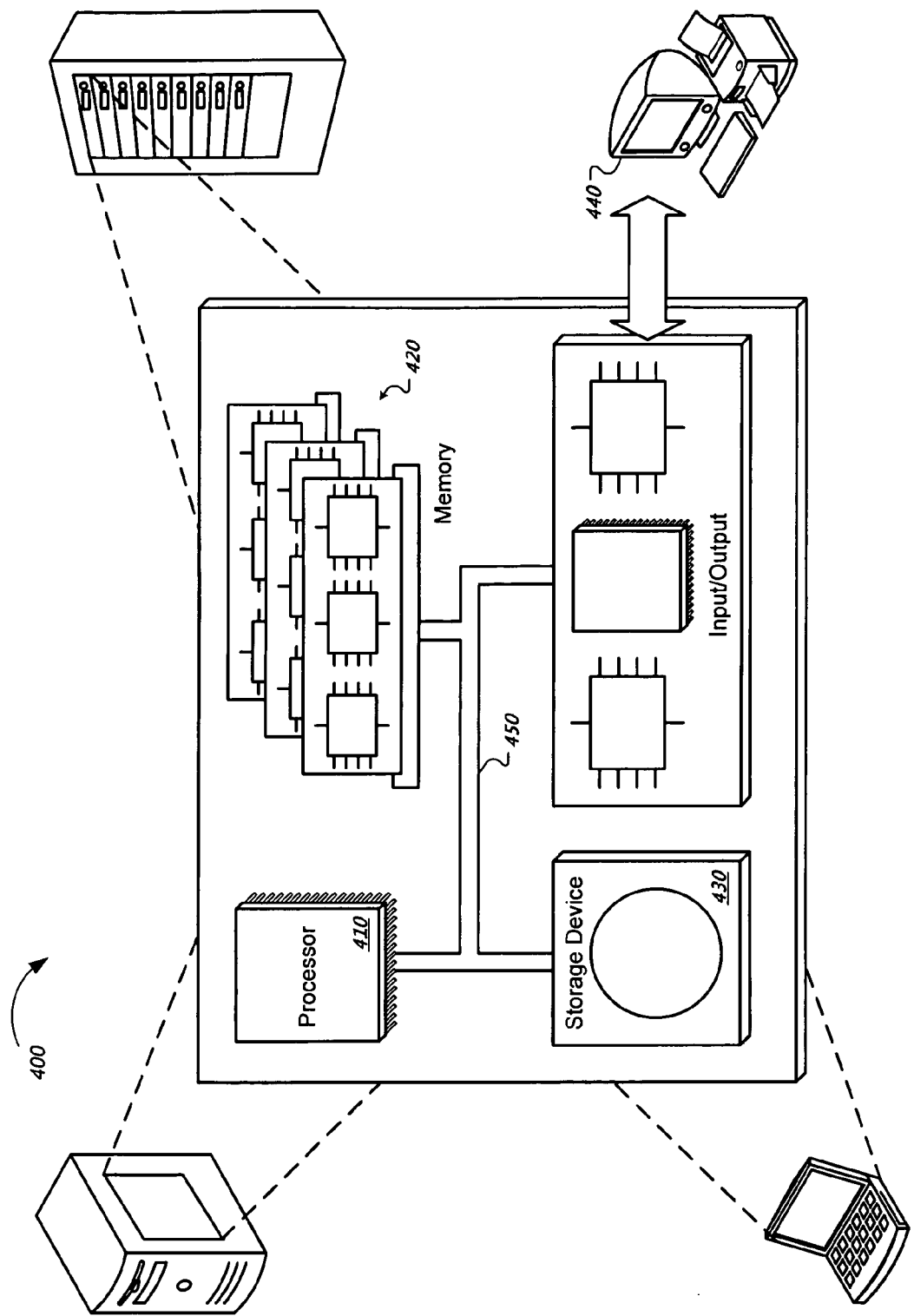
FIG. 4 is a schematic diagram of a generic computer system.

FIG. 4 is a schematic diagram of a generic computer system 400. The system 400 can be used for practicing operations described, for example in association with the method 300 of FIG. 3, in one embodiment. The system 400 can include a processor 410, a memory 420, a storage device 430, and input/output devices 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 is a computer readable medium such as volatile or non volatile that stores information within the system 400. The storage device 430 is capable of providing persistent storage for the system 400. The storage device 430 may be a floppy disk device, a hard disk device, an optical disk device, or a tape device, or other suitable persistent storage means. The input/output device 440 provides input/output operations for the system 400. In one implementation, the input/output device 440 includes a keyboard and/or pointing device. In another implementation, the input/output device 440 includes a display unit for displaying graphical user interfaces.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
    distributing a parameterized model to each worker of a plurality of workers, the plurality of workers being arranged in a hierarchy of workers, the parameterized model including a plurality of feature functions representing a plurality of features and corresponding model parameters;
    processing a portion of training data at each worker of the plurality of workers according to the parameterized model, the training data including a number of training examples, to calculate updates to model parameters;
    for each worker at a lowest level of the hierarchy of workers, sending the calculated updates to a next higher level worker;
    for each other worker in the hierarchy of workers, combining updates of the respective worker with updates received from one or more lower level workers;
    collecting all updates from the workers at a master to generate real updates to the model parameters;
    generating an updated model using the real updates to the model parameters; and
    distributing the updated model to each worker when performing a next iteration.

2. The method of claim 1, where the training data includes a plurality of example input-output pairs, each example input-output pair including an input and a correct output.

3. The method of claim 2, where identifying updates comprises:
    providing a first input to the model from a first example input-output pair;

calculating a difference between an output generated by the model according to the input and the correct output of the first example input-output pair;
determining which model features fire in response to the first input; and
calculating an update to one or more model parameters associated with the firing model features.

4. The method of claim 1, further comprising:
receiving training data; and
assigning a distinct portion of the training data to each worker.

5. The method of claim 4, further comprising:
dynamically defining the hierarchy of workers according to a size of the received training data.

6. The method of claim 1, where generating real updates comprises:
calculating a quotient of combined updates for a parameter and the number of workers contributing to the combined updates.

7. The method of claim 1, where each worker independently processes the respective portion of the training data in an online manner to generate worker level updates to model parameters.

8. The method of claim 1, where generating the updated model further comprises:
comparing parameter updates for each feature to a threshold contribution score; and
when the parameter updates for a particular feature are below a threshold contribution score, updating the model without updating the parameter value for the particular feature.

9. A method comprising:
receiving training data, the training data including source and target language pairs;
distributing portions of the training data to each worker of a plurality of workers where the plurality of workers are arranged in a hierarchy of workers;
identifying a parameterized model that includes a plurality of features and corresponding parameters, the features including lexical n-gram features;
training the model, including:
distributing the model to each worker of the hierarchy of workers,
processing a portion of training data at each worker of the plurality of workers according to the parameterized model to identify updates to the model parameters,
for each worker at a lowest level of the hierarchy of workers, sending the calculated parameter updates to a next higher level worker,
for each other worker in the hierarchy of workers, combining parameter updates of the respective worker with parameter updates received from one or more lower level workers,
collecting all updates from the workers at a master to generate real updates to the model parameters, and
generating an updated model using the real updates to the parameters; and
distributing the updated model to each worker when performing a next iteration.

10. The method of claim 9, where generating real updates comprises:
calculating a quotient of combined updates for a parameter and the number of workers contributing to the combined updates.

11. The method of claim 9, where generating the updated model further comprises:

comparing parameter updates for each feature to a threshold contribution score; and
when the parameter updates for a particular feature are below a threshold contribution score, updating the model without updating the parameter value for the particular feature.

12. The method of claim 9, further comprising:
performing a plurality of iterations, each iteration including distributing an updated model, the updated model generated during a previous iteration, to each worker and generating parameter updates by applying the portion of the training data assigned to each worker to the updated model of the iteration.

13. The method of claim 12, further comprising:
when no more iterations are to be performed, using the last updated model to process input text to provide translated output text.

14. A system comprising:
one or more computers configured to perform operations including:
distributing a parameterized model to each worker of a plurality of workers, the plurality of workers being arranged in a hierarchy of workers, the parameterized model including a plurality of feature functions representing a plurality of features and corresponding model parameters;
processing a portion of training data at each worker of the plurality of workers according to the parameterized model, the training data including a number of training examples, to calculate updates to model parameters;
for each worker at a lowest level of the hierarchy of workers, sending the calculated updates to a next higher level worker;
for each other worker in the hierarchy of workers, combining updates of the respective worker with updates received from one or more lower level workers;
collecting all updates from the workers at a master to generate real updates to the model parameters;
generating an updated model using the real updates to the model parameters; and
distributing the updated model to each worker when performing a next iteration.

15. The system of claim 14, where the training data includes a plurality of example input output pairs, each example input-output pair including an input and a correct output.

16. The system of claim 15, where identifying updates comprises:
providing a first input to the model from a first example input-output pair;
calculating a difference between an output generated by the model according to the input and the correct output of the first example input-output pair;
determining which model features fire in response to the example input; and
calculating an update to one or more model parameters associated with the firing model features.

17. The system of claim 14, where the one or more computers are further configured to perform operations comprising:
receiving training data; and
assigning a distinct portion of the training data to each worker.

18. The system of claim 17, where the one or more computers are further configured to perform operations comprising:

dynamically defining the hierarchy of workers according to a size of the received training data.

19. The system of claim 14, where generating real updates comprises:
calculating a quotient of combined updates for a parameter and the number of workers contributing to the combined updates.

20. The system of claim 14, where each worker independently processes the respective portion of the training data in an online manner to generate worker level updates to model parameters.

21. The system of claim 14, where generating the updated model further comprises:
comparing parameter updates for each feature to a threshold contribution score; and
when the parameter updates for a particular feature are below a threshold contribution score, updating the model without updating the parameter value for the particular feature.

22. A system comprising:
one or more computers configured to perform operations including:
receiving training data, the training data including source and target language pairs;
distributing portions of the training data to each worker of a plurality of workers where the plurality of workers are arranged in a hierarchy of workers;
identifying a parameterized model that includes a plurality of features and corresponding parameters, the features including lexical n-gram features;
training the model, including:
distributing the model to each worker of the hierarchy of workers,
processing a portion of training data at each worker of the plurality of workers according to the parameterized model to identify updates to the model parameters,
for each worker at a lowest level of the hierarchy of workers, sending the calculated parameter updates to a next higher level worker,
for each other worker in the hierarchy of workers, combining parameter updates of the respective worker with parameter updates received from one or more lower level workers,
collecting all updates from the workers at a master to generate real updates to the model parameters, and
generating an updated model using the real updates to the parameters; and
distributing the updated model to each worker when performing a next iteration.

23. The system of claim 22, where generating real updates comprises:
calculating a quotient of combined updates for a parameter and the number of workers contributing to the combined updates.

24. The system of claim 22, where generating the updated model further comprises:
comparing parameter updates for each feature to a threshold contribution score; and
when the parameter updates for a particular feature are below a threshold contribution score, updating the model without updating the parameter value for the particular feature.

25. The system of claim 22, where the one or more computers are further configured to perform operations comprising:

performing a plurality of iterations, each iteration including distributing an updated model, the updated model generated during a previous iteration, to each worker and generating parameter updates by applying the portion of the training data assigned to each worker to the updated model of the iteration.

26. The system of claim 25, where the one or more computers are further configured to perform operations comprising:
when no more iterations are to be performed, using the last updated model to process input text to provide translated output text.

27. A computer program product, encoded on a computer-readable medium, operable to cause data processing apparatus to perform operations comprising:
distributing a parameterized model to each worker of a plurality of workers, the plurality of workers being arranged in a hierarchy of workers, the parameterized model including a plurality of feature functions representing a plurality of features and corresponding model parameters;
processing a portion of training data at each worker of the plurality of workers according to the parameterized model, the training data including a number of training examples, to calculate updates to model parameters;
for each worker at a lowest level of the hierarchy of workers, sending the calculated updates to a next higher level worker;
for each other worker in the hierarchy of workers, combining updates of the respective worker with updates received from one or more lower level workers;
collecting all updates from the workers at a master to generate real updates to the model parameters;
generating an updated model using the real updates to the model parameters; and
distributing the updated model to each worker when performing a next iteration.

28. The computer program product of claim 27, where the training data includes a plurality of example input output pairs, each example input-output pair including an input and a correct output.

29. The computer program product of claim 28, where identifying updates comprises:
providing a first input to the model from a first example input-output pair;
calculating a difference between an output generated by the model according to the input and the correct output of the first example input-output pair;
determining which model features fire in response to the example input; and
calculating an update to one or more model parameters associated with the firing model features.

30. The computer program product of claim 27, operable to cause data processing apparatus to perform operations further comprising:
receiving training data; and
assigning a distinct portion of the training data to each worker.

31. The computer program product of claim 30, operable to cause data processing apparatus to perform operations further comprising:
dynamically defining the hierarchy of workers according to a size of the received training data.

32. The computer program product of claim 27, where generating real updates comprises:

calculating a quotient of combined updates for a parameter and the number of workers contributing to the combined updates.

33. The computer program product of claim 27, where each worker independently processes the respective portion of the training data in an online manner to generate worker level updates to model parameters.

34. The computer program product of claim 27, where generating the updated model further comprises:
   comparing parameter updates for each feature to a threshold contribution score; and
   when the parameter updates for a particular feature are below a threshold contribution score, updating the model without updating the parameter value for the particular feature.

35. A computer program product, encoded on a computer-readable medium, operable to cause data processing apparatus to perform operations comprising:
   receiving training data, the training data including source and target language pairs;
   distributing portions of the training data to each worker of a plurality of workers where the plurality of workers are arranged in a hierarchy of workers;
   identifying a parameterized model that includes a plurality of features and corresponding parameters, the features including lexical n-gram features;
   training the model, including:
      distributing the model to each worker of the hierarchy of workers,
      processing a portion of training data at each worker of the plurality of workers according to the parameterized model to identify updates to the model parameters,
      for each worker at a lowest level of the hierarchy of workers, sending the calculated parameter updates to a next higher level worker,
      for each other worker in the hierarchy of workers, combining parameter updates of the respective worker with parameter updates received from one or more lower level workers,
      collecting all updates from the workers at a master to generate real updates to the model parameters, and
      generating an updated model using the real updates to the parameters; and
   distributing the updated model to each worker when performing a next iteration.

36. The computer program product of claim 35, where generating real updates comprises:
   calculating a quotient of combined updates for a parameter and the number of workers contributing to the combined updates.

37. The computer program product of claim 35, where generating the updated model further comprises:
   comparing parameter updates for each feature to a threshold contribution score; and
   when the parameter updates for a particular feature are below a threshold contribution score, updating the model without updating the parameter value for the particular feature.

38. The computer program product of claim 35, operable to cause data processing apparatus to perform operations further comprising:
   performing a plurality of iterations, each iteration including distributing an updated model, the updated model generated during a previous iteration, to each worker and generating parameter updates by applying the portion of the training data assigned to each worker to the updated model of the iteration.

39. The computer program product of claim 38, operable to cause data processing apparatus to perform operations further comprising:
   when no more iterations are to be performed, using the last updated model to process input text to provide translated output text.

\* \* \* \* \*